(12) United States Patent
Henry et al.

(10) Patent No.: US 8,457,135 B2
(45) Date of Patent: *Jun. 4, 2013

(54) HIERARCHICAL NETWORK TOPOLOGY

(75) Inventors: Ronald Michael Henry, Calgary (CA); Vernonica Frances Merryfield, Port Alberni (CA)

(73) Assignee: TeraScale Supercomputing Inc., Calgary, Alberta (CA)

( * ) Notice: Subject to any disclaimer, the term of this patent is extended or adjusted under 35 U.S.C. 154(b) by 225 days.

This patent is subject to a terminal disclaimer.

(21) Appl. No.: 13/099,898

(22) Filed: May 3, 2011

(65) Prior Publication Data
US 2011/0206053 A1 Aug. 25, 2011

Related U.S. Application Data

(63) Continuation of application No. 12/412,253, filed on Mar. 26, 2009, now Pat. No. 7,957,400.

(51) Int. Cl.
*H04L 12/28* (2006.01)
(52) U.S. Cl.
USPC ........... 370/400; 370/252; 370/255; 370/256; 370/407; 370/425; 709/243; 709/252
(58) Field of Classification Search
USPC ............... 370/252, 255, 256, 360, 362, 380, 370/386–388, 400, 407, 422, 425; 709/243, 709/244, 252
See application file for complete search history.

(56) References Cited

U.S. PATENT DOCUMENTS

| | | |
|---|---|---|
| 5,140,583 A | 8/1992 | May et al. |
| 5,471,580 A | 11/1995 | Fujiwara et al. |
| 5,509,123 A | 4/1996 | Dobbins et al. |
| 5,606,551 A | 2/1997 | Kartalopoulos |
| 6,212,184 B1 | 4/2001 | Venkatachary et al. |
| 6,389,031 B1 | 5/2002 | Chao et al. |
| 6,597,661 B1 | 7/2003 | Bonn |

(Continued)

FOREIGN PATENT DOCUMENTS

| | | |
|---|---|---|
| EP | 1 587 282 | 10/2005 |
| WO | WO 00/74305 | 12/2000 |

(Continued)

OTHER PUBLICATIONS

Brian Bourgon, et al., "A Self-Stabilizing Shortest Path Algorithm in a DAG," IEEE, 0-7803-2492-7/95, 1995, pp. 341-345.

(Continued)

*Primary Examiner* — Hoon J Chung
(74) *Attorney, Agent, or Firm* — Fish & Richardson P.C.

(57) ABSTRACT

A network including a hierarchical structure of nodes is described. The structure of nodes includes n layers including n−1 layers of switch nodes and 1 layer of computational nodes. Each layer in the structure can include $m^{n-L}$ nodes grouped into units, where m represents a number of nodes in a unit and L represents a layer in the structure, where L=0 represents a lowest layer and L=n−1 represents a highest layer. Each node in a layer other than the computational layer can include a switch node for a unit in a next lower layer. For each unit, each node can be connected to each other node by a point to point link and to a local switch node for the unit by a point to point link. Each node can be connected to each other node and to the local switch node by a local broadcast network for the unit.

10 Claims, 10 Drawing Sheets

U.S. PATENT DOCUMENTS

| | | |
|---|---|---|
| 6,853,635 B1 | 2/2005 | Beshai |
| 6,912,196 B1 | 6/2005 | Mahalingaiah |
| 7,002,958 B1 | 2/2006 | Basturk et al. |
| 7,027,453 B2 | 4/2006 | Lui et al. |
| 7,089,240 B2 | 8/2006 | Basso et al. |
| 7,212,531 B1 | 5/2007 | Kopelman et al. |
| 7,394,809 B2 | 7/2008 | Kumar et al. |
| 7,412,557 B2 | 8/2008 | Di Benedetto et al. |
| 7,426,214 B2 | 9/2008 | Reed |
| 7,433,871 B2 | 10/2008 | Deforche et al. |
| 8,131,867 B1 | 3/2012 | Luby |
| 2001/0026557 A1 | 10/2001 | Gaedeken et al. |
| 2002/0114326 A1 | 8/2002 | Mahalingaiah |
| 2002/0174207 A1 | 11/2002 | Battou |
| 2003/0009474 A1 | 1/2003 | Hyland et al. |
| 2007/0245044 A1 | 10/2007 | Douady et al. |
| 2007/0263535 A1 | 11/2007 | Shabtay |
| 2008/0273474 A1 | 11/2008 | Yanagihara |
| 2009/0049114 A1 | 2/2009 | Faraj |
| 2010/0076856 A1 | 3/2010 | Mullins |
| 2010/0157788 A1 | 6/2010 | Ellis et al. |
| 2010/0246437 A1 | 9/2010 | Henry et al. |
| 2010/0246581 A1 | 9/2010 | Henry et al. |
| 2010/0250784 A1 | 9/2010 | Henry et al. |

FOREIGN PATENT DOCUMENTS

| | | |
|---|---|---|
| WO | WO 02/33898 | 4/2002 |
| WO | WO 2004/040846 | 5/2004 |
| WO | WO 2004/046963 | 6/2004 |

OTHER PUBLICATIONS

Bouabdallah et al, "Embedding Complete Binary Trees into Star Networks", 1994, The 19th International Symposium on Mathematical Foundations of Computer Science, 1994, p. 266-275.

Cohen et al., "Framework for Multicast in Hierarchical Networks" INFOCOM 2000, Nineteenth Annual Joint Conference of the IEEE Computer and Communications Societies, Proceedings, IEEE, Tel Aviv, Israel, Mar. 26-30, 2000, pp. 1673-1682.

Dhritiman Banerjee, et al., "The Multidimentional Torus: Analysis of Average Hop Distance and Application as a Multihop Lightwave Network," IEEE International Conference on Communications, 1994. ICC 94. vol. 3, pp. 1675-1680, May 1-5, 1994.

"Hop count," from Wikipedia [online] Retrieved from the Internet: <URL: http://en.wikipedia.org/wiki/Hop_count>, [retrieved on Oct. 1, 2007]. 1 page.

International Search Report from International Application No. PCT/CA2010/000416 mailed Jun. 22, 2010, 13 pages.

International Search Report from International Application No. PCT/CA2010/000415 mailed Jun. 15, 2010, 11 pages.

International Search Report from International Application No. PCT/CA2010/000414 mailed Jun. 21, 2010, 10 pages.

Lamehamedi et al., "Simulation of Dynamic Data Replication Strategies in Data Grids", Parallel and Distributed Processing Symposium, 2003, Proceedings, International, Apr. 22-26, 2003, pp. 100-109.

Lee-Juan Fan, et al., "Routing Algorithms on the Bus-Based Hypercube Network," IEEE Transactions on Parallel and Distributed Systems, vol. 16, No. 4, Apr. 2005, pp. 335-348.

Liebeherr et al., "A Scalable Control Topology for Multicast Communications", INFOCOM 1998, Seventeenth Annual Joint Conference of the IEEE Computer and Communications Societies, Proceedings, IEEE, San Francisco, CA USA, Mar. 29, 1998-Apr. 2, 1998, pp. 1197-1204.

M.M. Hafizur Rahman, et al., "Modified Hierarchical 3D-Torus Network," IEICE Transactions on Information and Systems, vol. E88-D No. 2, Feb. 2005, pp. 177-185.

Mokhtar A. Aboelaze , "MLH : A hierarchical hypercube network," Networks (journal), 1996, vol. 28, No. 3, pp. 157-165.

"Network topology," from Wikipedia [online]. Retrieved from the Internet: <URL: http://en.wikipedia.org/wiki/Network_topology>, [retrieved on Mar. 31, 2008]. 11 pages.

Non-Final Office Action from U.S. Appl. No. 12/412,253, dated Oct. 1, 2010, 20 pages.

Non-Final Office Action from U.S. Appl. No. 12/412,289, dated May 18, 2010, 13 pages.

Al-Fares, M., et al., "A Scalable, Commodity Data Center Network Architecture", SIGCOMM '08 Proceedings, Seattle, Washing, USA, Aug. 17, 2008, pp. 63-74.

European Office Action from EP Application No. 10755354.7 mailed Sep. 28, 2012, 5 pgs.

European Office Action from EP Application No. 10755355.4 mailed Oct. 11, 2012, 5 pgs.

European Office Action from EP Application No. 10755353.9 mailed Sep. 28, 2012, 5 pgs.

European Search Report from EP Application No. 10755355.4 mailed Sep. 21, 2012, 3 pgs.

International Preliminary Report on Patentability from International Application No. PCT/CA2010/000414 mailed Oct. 6, 2011, 6 pages.

International Preliminary Report on Patentability from International Application No. PCT/CA2010/000415 mailed Oct. 6, 2011, 7 pages.

International Preliminary Report on Patentability from International Application No. PCT/CA2010/000416 mailed Oct. 6, 2011, 8 pages.

Non-Final Office Action from U.S. Appl. No. 12/412,269, dated Sep. 7, 2011, 13 pgs.

Final Office Action from U.S. Appl. No. 12/412,269, dated Jul. 5, 2012, 13 pgs.

HIERARCHICAL NETWORK TOPOLOGY

CROSS REFERENCE TO RELATED APPLICATION

This application is a continuation application of, and claims priority to, pending U.S. patent application Ser. No. 12/412,253, filed on Mar. 26, 2009, entitled "Hierarchical Network Topology". The disclosure of the foregoing application is incorporated herein by reference in its entirety.

TECHNICAL FIELD

This invention relates to electronic communications.

BACKGROUND

The arrangement of a network of nodes and links is defined by a network topology. The network topology can determine the physical and logical interconnections between the network nodes, where each node has one or more links to one or more other nodes. The physical topology of a network is determined by the configuration of the physical connections between the nodes. The configuration can be represented by a multi-dimensional geometric shape, for example, a ring, a star, a line, a lattice, a hypercube, or a torus. The logical topology of a network is determined by the flow of data between the nodes.

A network of processing nodes can be used for supercomputing applications. For example, a large supercomputing application can be broken into different subsets of instructions running on different processing nodes of a network. In order to reduce latency and improve efficiency, distribution of traffic across the entire network and maximized communication between nodes on a local level are preferred.

Typically, a network's addressing and routing schemes increase in complexity with an increase in the complexity of the network topology. Complex routing tables can require significant central processing unit (CPU) time to implement. Conventional packet routing requires that a packet must be completely received at a node before the destination address in the packet's header can be decoded and the packet can be forwarded, resulting in latency. Latency can also increase with a complex addressing scheme. A complex network topology can have a high hop count to node ratio, where each hop introduces several clock cycles of packet latency.

SUMMARY

This specification describes systems, methods, and computer program products related to a network topology. In general, in one aspect, the invention features a network including a hierarchical structure of nodes. The structure of nodes includes n layers including n−1 layers of switch nodes and 1 layer of computational nodes. Each layer in the structure includes $m^{n-L}$ nodes grouped into units, where m represents a number of nodes in a unit and is an integer greater than 1. L represents a layer in the structure and is an integer with L=0 representing a lowest layer and L=n−1 representing a highest layer. Each node in a layer other than the computational layer includes a switch node for a unit in a next lower layer in the structure. For each unit, each node in the unit is connected to each other node in the unit by a point to point link, each node in the unit is connected to a local switch node for the unit by a point to point link, and each node in the unit is connected to each other node in the unit and to the local switch node by a local broadcast network for the unit.

Implementations of the network can include one or more of the following features. Each computational node can include a processing element operable to perform instructions of one or more applications. The lowest layer in the structure can be the layer of computational nodes and can include $m^n$ computational nodes. Each node in the unit can be connected to each other node in the unit and to the local switch node by an Ethernet network. Each computational node can include a processing element, a controller, and memory. Each computational node can include communication hardware implemented as a field programmable gate array.

In general, in another aspect, the invention features a network including a hierarchical structure of nodes including n layers. The n layers include n−1 layers of switch nodes and 1 layer of computational nodes. Each layer in the structure includes one or more units of nodes, where L represents a layer in the structure and is an integer with L=0 representing a lowest layer and L=n−1 representing a highest layer and a number of nodes in a unit is greater than 1. Each node in a layer other than the computational layer includes a switch node for a unit in a next lower layer in the structure. For each unit, each node in the unit is connected to each other node in the unit by a point to point link, each node in the unit is connected to a local switch node for the unit by a point to point link, and each node in the unit is connected to each other node in the unit and to the local switch node by a local broadcast network for the unit.

Implementations of the network can include one or more of the following features. One or more point to point links included in one or more units can be deactivated. Each unit of a layer in the structure can have the same number of nodes. Each unit of each layer in the structure can have the same number of nodes. Each unit can include a local, three-dimensional network topology represented by a 2×2×2 cube including 8 nodes. Each computational node can include a processing element operable to perform instructions of one or more applications.

The lowest layer in the structure can be the layer of computational nodes. Each node in the unit can be connected to each other node in the unit and to the local switch node by an Ethernet network. Each computational node can include a processing element, a controller, and memory. Each computational node can include communication hardware implemented as a field programmable gate array.

In general, in another aspect, the invention features a networked device including a hierarchical structure of nodes and a processor. The hierarchical structure of nodes includes n layers including n−1 layers of switch nodes and 1 layer of computational nodes. L represents a layer in the hierarchical structure and is an integer with L=0 representing a lowest layer and L=n−1 representing a highest layer. The processor is configured for processing n groups of bits received in a packet, where each computational node is fully addressed by the n groups of bits and each switch node of a layer L is fully addressed by n−L groups of most significant bits.

Implementations of the networked device can include one or more of the following features. Each of the n groups of bits can include the same number of bits. In some implementations, each layer includes one or more units of nodes, each unit includes a local 2×2×2 cubic network with two nodes per side in each of three dimensions x, y and z, and each node is logically located within the cubic network using a three-dimensional address {x,y,z} ranging from {0,0,0} to {1,1,1}, where the three-dimensional address logically locating each node within the cubic network comprises one of the n groups of bits. In some implementations, each layer includes one or more units of nodes, each unit includes a local 2×4×4 network with two nodes per side in an x dimension and four nodes per side in each of an y and z dimension, and each node is logically located within the local network using a three-dimensional address {x,y1,y2,z1,z2} ranging from {0,0,0,0,0} to {1,1,1,1,1}, where the three-dimensional address logically locating each node within the local network comprises one of the n groups of bits.

In general, in another aspect, the invention features a method of routing packets in a network. The network has a topology characterized by a hierarchical structure of nodes including n layers. The n layers include n−1 layers of switch nodes and 1 layer of computational nodes, where L represents a layer in the structure and is an integer with L=0 representing a lowest layer and L=n−1 representing a highest layer. A packet is received at a switch node of layer L of the structure. The packet includes a header with a first address including n groups of bits. The switch node has a second address including n−L groups of bits. The packet is forwarded to a node in either the layer L, the layer L+1, or the layer L−1 based on a comparison of the first address and the second address.

In some implementations, if the n−L groups of most significant bits of the first address match the n−L groups of bits of the second address, then the message can be forwarded on a point to point link to a node of layer L−1 of the structure fully addressed by the n−L+1 groups of most significant bits of the first address. If the n−L groups do not match but the n−L−1 groups of most significant bits of the first address do match the n−L−1 groups of most significant bits of the second address, then the message can be forwarded on a point to point link to a switch node of layer L of the structure fully addressed by the n−L groups of most significant bits of the first address. If the n−L−1 groups of most significant bits of the first address do not match the n−L−1 groups of most significant bits of the second address, then the message can be forwarded on a point to point link to a switch node of layer L+1 of the structure fully addressed by the n−L−1 groups of most significant bits of the second address.

In general, in another aspect, the invention features a method of routing packets in a network, the network having a topology characterized by a hierarchical structure of nodes having n layers. The n layers include n−1 layers of switch nodes and 1 layer of computational nodes, where L represents a layer in the structure and is an integer with L=0 representing a lowest layer and L=n−1 representing a highest layer. A packet can be transmitted from a computational node of layer L to either a second computational node of layer L or to a switch node of layer L+1. The packet includes a header with a first address including n groups of bits, and the computational node has a second address including n groups of bits. The packet can be transmitted based on a comparison of the first and the second address.

In some implementations, if n−1 groups of most significant bits of the first address match n−1 groups of most significant bits of the second address, then the message can be forwarded on a point to point link to the second computational node of layer L of the structure fully addressed by the n groups of bits of the first address. If the n−1 groups do not match, then the message can be forwarded on a point to point link to the switch node of layer L+1 of the structure fully addressed by the n−1 groups of most significant bits of the second address.

In general, in another aspect, the invention features a method of routing a packet in a network, the network having a topology characterized by a hierarchical structure of nodes including n layers. L represents a layer in the structure and is an integer with L=0 representing a lowest layer and L=n−1 representing a highest layer. The method includes receiving at least a packet header of a packet at a first node and based on the packet header, determining whether to transmit the packet to a second node in either layer L, layer L+1, or layer L−1. The packet is transmitted to the second node as soon as the packet is received at the first node without waiting to receive an entire packet and without copying the packet prior to transmission from the first node.

Implementations of the method can include one or more of the following features. The n layers can include n−1 layers of switch nodes and 1 layer of computational nodes. Each layer in the structure can include nodes grouped into units having more than one node per unit, and each node in a layer other than the computational layer can include a switch node for a unit in a next lower layer in the structure. The first node can be a switch node and transmitting a packet to a second node in the layer L can include transmitting the packet to the second node in the same unit as the first node by a point to point link. Transmitting a packet to a second node in the layer L+1 or the layer L−1 can include transmitting the packet to the second node in a different unit than the first node by a point to point link.

In general, in another aspect, the invention features a system including a hierarchical structure of nodes including n layers. The n layers include n−1 layers of switch nodes and 1 layer of computational nodes, where each layer in the hierarchical structure includes one or more units of nodes. L represents a layer in the structure and is an integer with L=0 representing a lowest layer and L=n−1 representing a highest layer and a number of nodes in a unit is greater than 1. The switch nodes are configured to: receive at least a packet header of a packet; based on the packet header, determine whether to transmit the packet to a second node in either layer L, layer L+1, or layer L−1; and transmit one or more packets forming a message to the second node as soon as the packets are received at the switch node without waiting to receive an entire packet and without copying the packet prior to transmission from the switch node.

Implementations of the system can include one or more of the following features. The computational nodes can each include at least one processor, communication hardware, and a memory. The at least one processor can include an application processor and an operating system processor. The communication hardware can include a field-programmable gate array (FPGA). The communication hardware can be configured to monitor traffic to the computational node. The communication hardware can be configured to direct a message received at the computational node to the processor, and receive a message from the processor for transmission to a different node. Each node in a layer other than the computational layer can include a switch node for a unit in a next lower layer in the structure. For each unit, each node in the unit can be connected to each other node in the unit by a point to point link, each node in the unit can be connected to a local switch node for the unit by a point to point link, and each node in the unit can be connected to each other node in the unit and to the local switch node by a local broadcast network for the unit. The switch nodes can each include a processor and communication hardware.

Implementations can realize one or more of the following advantages. A hierarchical three-dimensional (3-D) network topology allows for a simple addressing scheme, where routing is intrinsically linked to the network topology, promoting fast message delivery with reduced latency. The network topology also offers the benefit of tight local groups of processing nodes, facilitating distribution of traffic on a local level. The network topology yields a low hop count to node ratio for point-to-point and multicast communications. The protocol is streamed, which allows a switch node to begin forwarding a message before the packet has been completely received at the switch node, further minimizing latency. Multicast and broadcast communications only use the network layers necessary for packet delivery without utilizing the entire network.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A network having a network topology including a hierarchical structure of nodes is described. In some implementations, the hierarchical structure can include n layers: n−1 layers of switch nodes and 1 layer of computational nodes. Each layer in the structure can include one or more units, a unit including a set of nodes. Each unit within a layer can have the same number of nodes or a different number of nodes as units in different layers. Each node in a layer, other than the computational layer, can include a switch node for a unit in a next lower layer in the structure. Each node in the unit can be connected to each other node in the unit and to a local switch node for the unit by a point to point link. Each node in the unit can also be connected to each other node in the unit and to the local switch node by a local broadcast network for the unit.

The network topology is a hybrid of a hierarchical (e.g., tree) network topology and a fully connected network topology. In some implementations, each unit of a layer in the hierarchical structure has eight fully connected nodes in a 2×2×2 arrangement, which can be visualized as a cubic network with two nodes per side in each of three dimensions. Messages can be routed through this 3-D network using a simple addressing scheme. This 3-D network local to a unit can be repeated hierarchically through the layers of the structure to retain the same attributes throughout the entire network. This arrangement allows a complex network to be realized without the need for complex routing tables or other complex schemes that take significant CPU time to implement.

Figure 1:
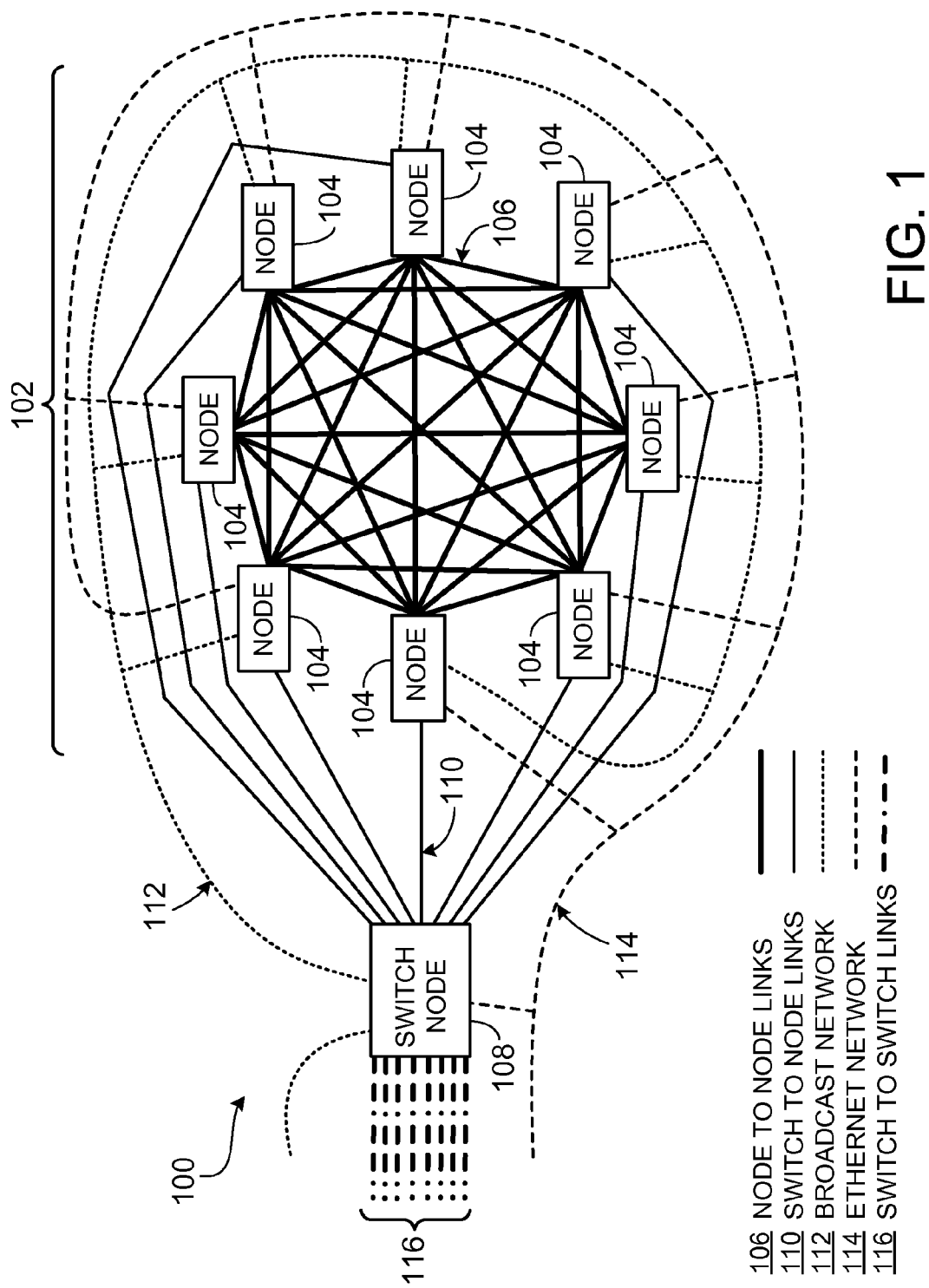
FIG. 1 illustrates an example network having a network topology.

An example of a network topology 100 is illustrated in FIG. 1. In particular, FIG. 1 illustrates a unit 102 of computational nodes 104 at the lowest layer in the hierarchical structure of the network topology 100. The local network topology of the unit 102 is formed around eight computational nodes 104, known as leaf nodes.

In some implementations, each computational node 104 includes a processing element operable to perform instructions of one or more applications. In some implementations, different computational nodes 104 include different processing elements. In some implementations, some computational nodes 104 include different or unique processing elements, while the remaining computational nodes 104 include uniform processing elements. In some implementations, one or more switch nodes 108 include a processing element, for example, for traffic management.

Each computational node 104 is connected to each other computational node 104 of the unit 102 by a point to point link 106 (e.g., a high speed node to node link). Each computational node 104 is connected to a switch node 108 of a unit in the next higher layer by a point to point link 110 (e.g., a high speed switch to node link). Each computational node 104 is also connected to each other computational node 104 of the unit 102 and the switch node 108 by a local broadcast network 112 for the unit 102. The switch node 108 can bridge the local broadcast network 112 for the unit 102 to other local broadcast networks of other units of the hierarchical structure of the network topology 100. The local broadcast network 112 allows communication with all the computational nodes 104 of the unit 102 or a subset of the computational nodes 104 of the unit 102.

Operating system (OS) software can be distributed throughout the network at each node and switch. The OS software can include local services as well as system wide supervisory functions. In some implementations, each computational node 104 is also connected to each other computational node 104 of the unit 102 and the switch node 108 by an Ethernet network 114. The Ethernet network 114 can be used for system administration functions (e.g., low data rate system maintenance and monitoring) that are independent of application software. Examples of communication on the Ethernet network 114 include logging information about CPU temperatures, time-synching, and transmission control protocol (TCP). In some implementations, if the network topology 100 does not include an Ethernet network 114, the system administration messages can be transported on the point to point links (e.g., node to node links and switch to node links).

In some implementations, each unit of each layer in the hierarchical structure of the network topology 100 has the same node arrangement. However, for layers above the lowest layer, each node of a unit is a switch node for a unit in the layer below. For example, the switch node 108 is a node of a unit in the second lowest layer (i.e., layer L=1) and acts as a switch for the unit 102 in the lowest layer (i.e., layer L=0). In some implementations, the switch nodes of a unit in a layer are fully connected by point to point (i.e., switch to switch) links. For example, the switch node 108 of a unit in the second lowest layer is connected to all other switch nodes in the same unit and to a switch node of a unit in the layer above by the switch to switch links 116. As mentioned above, in other implementations, the number of nodes in a unit can vary across layers.

A multi-dimensional, hierarchically scalable network can use the example network topology 100 of FIG. 1. In implementations where each unit of each layer in the hierarchical structure has a local, 3-D network topology of a 2×2×2 cube of eight nodes, each node can be logically located within the octet using a 3-D address from {0,0,0} to {1,1,1}. That is, each node is addressed within a unit using three bits. The complete address of a computational node of the lowest layer of the hierarchical structure is a binary number divided into groups of three bits. The group of three least significant bits (LSB) of the binary number identifies a particular computational node (i.e., leaf node) of a unit of the lowest layer, while each group of more significant three bits corresponds to a particular switch node of a unit of a higher layer in the hierarchical structure. Addressing of the multi-dimensional, hierarchically scalable network is described in more detail with respect to FIGS. 4-5 below.

The multi-dimensional hierarchical network described can be scaled up, as needed, with successively larger hierarchical layers to accommodate supercomputing applications. The multi-dimensional hierarchical network provides efficient and flexible high speed communications needed in super-scale computing. For example, the use of dedicated point to point communications within the local network topology of a unit maximizes local throughput. The local broadcast network for a unit allows group communications independent of the point to point links. Each switch node is part of another unit with point to point and broadcast links, offering point to point, multicast, and broadcast communications throughout the flexible network.

The multi-dimensional hierarchical network can be designed to remove system overhead in order to minimize latency and maximize performance against cost and power consumption. For example, a system implementing the multi-dimensional hierarchical network can provide a software application with an industry-standard application programming interface (API) for message passing, implemented with minimal software overhead.

Figure 2:
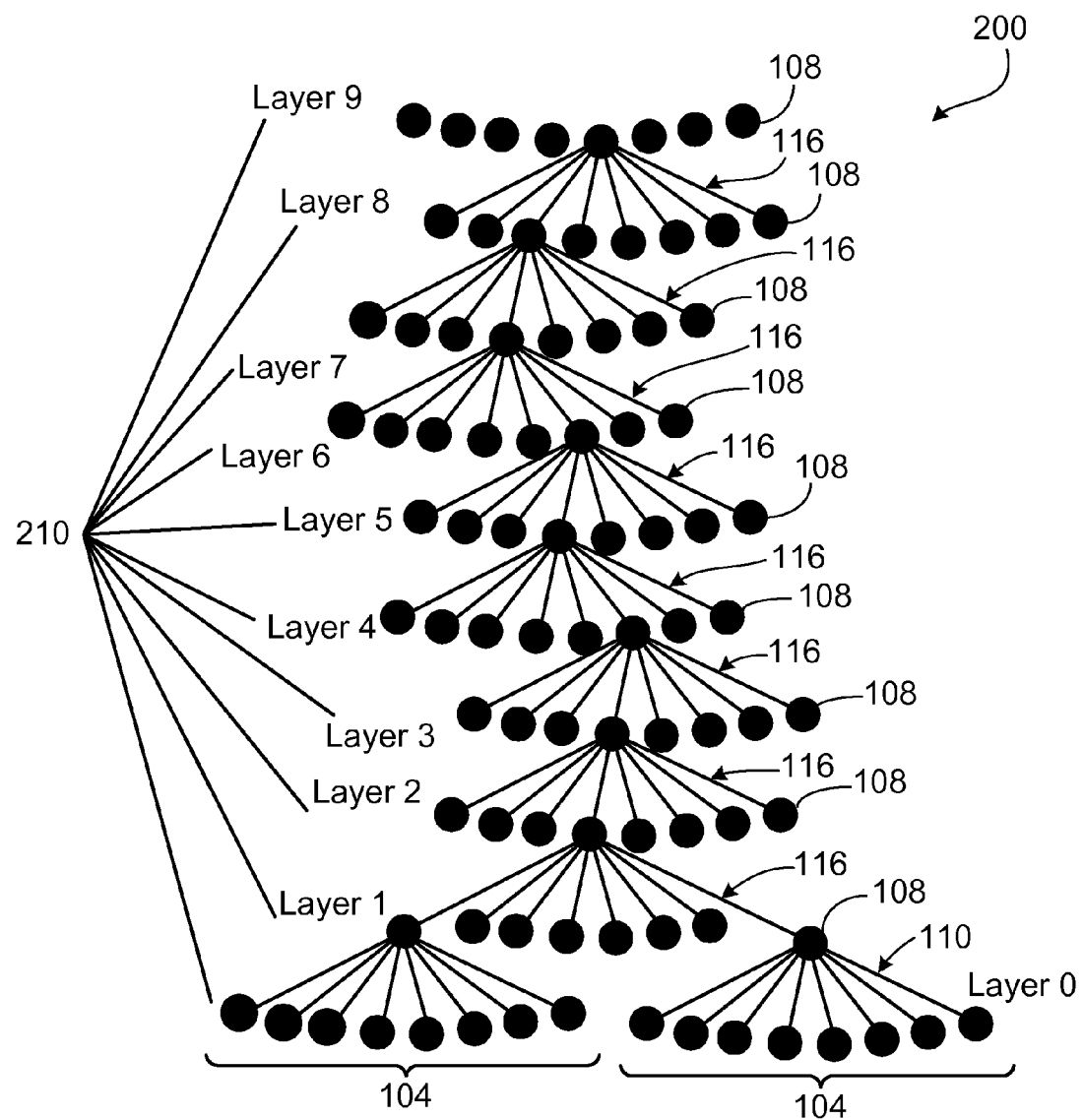
FIG. 2 illustrates an example hierarchical tree network.

FIG. 2 illustrates an example hierarchical tree network 200. The example hierarchical tree network 200 illustrates one way of viewing the hierarchical structure of the example network topology 100 of FIG. 1.

The example hierarchical tree network 200 includes n layers, including n−1 layers of switch nodes 108 and 1 layer of computational nodes 104, where n=10. As illustrated, the layer 210 of computational nodes 104 is the lowest layer (i.e., layer L=0). The layers 210 of switch nodes 108 are the upper n−1=9 layers (i.e., layers L=1, 2, . . . , 9). Each layer L includes $m^{n-L}$ nodes, where m represents the number of nodes in a unit and is an integer greater than 1. In the example of FIG. 2, the number of nodes, m, in a unit is eight. Thus, each unit of the lowest layer includes eight computational nodes 104, and each unit of a higher layer includes eight switch nodes 108. Each switch node 108 acts as a switch for the nodes of a unit in a next lower layer 210. For this example where n=10 and m=8, the lowest layer (i.e., layer L=0) includes $8^{10-0}$=1,073,741,824 computational nodes 104. Each computational node 104 can include a processing element operable to perform instructions of one or more software applications.

For clarity of FIG. 2, only a portion of the switch to node links 110 and the switch to switch links 116 are illustrated. The node to node links 106 between the computational nodes 104 of a unit of the lowest layer and the switch to switch links 116 between the switch nodes 108 of a unit of the higher layers are not illustrated. Other than the layer L=1, only one sub-tree from each layer 210 of switch nodes 108 is illustrated. The broadcast network 112 is also not illustrated.

Figure 3:
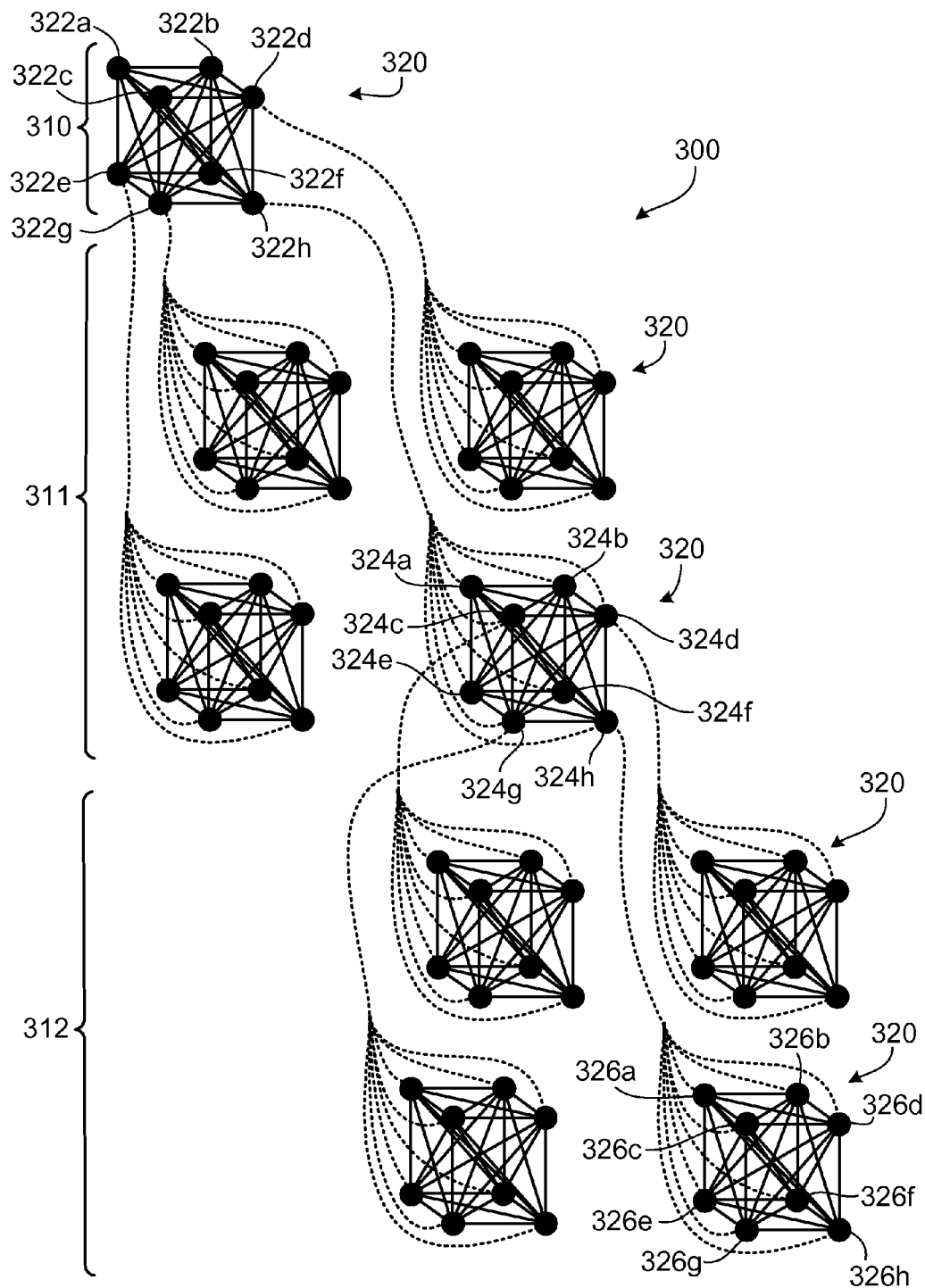
FIG. 3 illustrates an example hierarchical 3-D network.

FIG. 3 illustrates an example hierarchical 3-D network 300. The example hierarchical 3-D network 300 illustrates another way of viewing the hierarchical structure of the example network topology 100 of FIG. 1. FIG. 3 illustrates three layers 310-312 of nodes including switch nodes (e.g., switch nodes 108) in layers 310, 311 and computational nodes (e.g., computational nodes 104) in layer 312 of the example hierarchical 3-D network 300. The example hierarchical 3-D network 300 can include additional layers (not shown). For clarity of FIG. 3, only a portion of each of the layers 311 and 312 are illustrated.

In this implementation, each unit 320 of a layer in the hierarchical 3-D network 300 has eight fully connected nodes in a 2×2×2 arrangement as a cubic network with two nodes per side in each of three dimensions. In the upper two layers 310 and 311, each node (i.e., switch node 108) acts as a switch for the nodes of a unit 320 in a next lower layer i.e., layers 311 and 312, respectively. Each switch node 108 of a unit 320 of a layer is linked to each other switch node 108 of the same unit 320 in the same layer and to each node of a unit 320 in the next lower layer. For example, the unit 320 in the layer 310 includes eight switch nodes 322a-h. Each of the switch nodes 322a-h functions as a switch node for a unit included in the next layer down, i.e., layer 311. In this example, switch node 322h functions as a switch node for the unit 320 in layer 311 including the eight nodes 324a-h. The eight nodes 324a-h are also switch nodes, where each of the nodes 324a-h functions as a switch node for a unit included in the next layer down, i.e., layer 312. For example, switch node 324h functions as a switch node for the unit 320 included in the layer 312 having eight nodes 326a-h. In this example, the eight nodes 326a-h are computational nodes.

Figure 4:
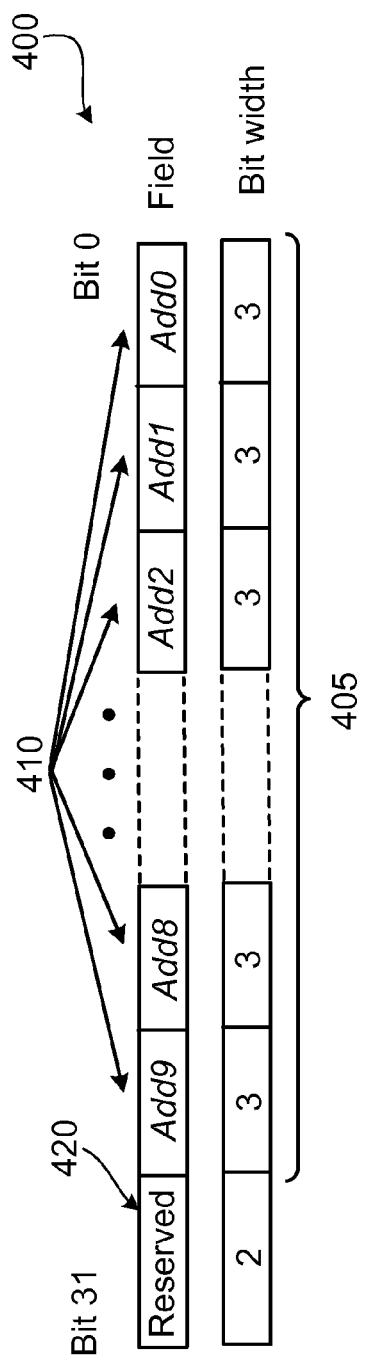
FIG. 4 illustrates an example addressing scheme for the hierarchical tree network of FIG. 2.

FIG. 4 illustrates an example addressing scheme 400 for the hierarchical tree network 200 of FIG. 2, which addressing scheme can be implemented by a networked device including a processor. The example addressing scheme 400 provides a destination address for a message as a 30-bit address 405 (i.e., from bit 0 to bit 29) in a four-byte address word. The 30-bit address 405 is divided into ten groups 410 of three bits, i.e., bit fields Add0, Add1, . . . , Add9. The two most significant bits (MSB) (i.e., bits 30 and 31) of the four-byte address word can be set aside as a reserved bit field 420 for future use.

The group 410 of three least significant bits (LSB) of the 30-bit address 405 (i.e., bit field Add0) identifies a particular computational node 104 of a unit of the lowest layer of the hierarchical tree network 200, while each group 410 of more significant bits (i.e., bit fields Add1 to Add9) corresponds to a particular switch node 108 of a unit of a consecutively higher layer in the hierarchical structure. That is, the eight computational nodes 104 of a unit of the lowest layer L=0 are addressed by Add0, and the switch nodes 108 at layers L=1 to L=9 are addressed by Add1 to Add9, respectively.

Each computational node 104 is fully addressed by the complete 30-bit address 405 (i.e., by bit fields Add0 to Add9). Each switch node 108 of a given layer is fully addressed by a partial address using bit field groups 410 from the given layer to the group 410 of MSB. For example, a switch node 108 of layer L=3 is fully addressed by bit fields Add3 to Add9.

In some implementations, each message packet includes a header with a number of fields, including, for example, the destination address, the size of the message packet, a checksum of the message packet, and a source address. The header can be prepended to the data in part by the operating system (OS) software and the hardware as the data is transmitted. The packet header provides all the data needed to deliver the packet intact. The checksum can be added by the OS at sending to provide a simple check that the entire packet is valid. A check can be made at the destination. In one example, the checksum used is a ones compliment sum as used in Internet Protocol (RFC971).

The reserved bit field 420 can be used for address range expansion, allowing a flexible number of address words while retaining the same overall structure for the addressing scheme 400. For example, the MSB (i.e., bit 31) of a four-byte address word can be a continuation bit indicating if the destination address is completely specified by the four-byte address word or if the destination address in the four-byte address word is a high portion of a multi-word destination address. Subsequent address words can also use the MSB to indicate another portion of the multi-word destination address.

The second MSB (i.e., bit 30) of the four-byte address word can indicate if the destination address is a point to point protocol address, or if the destination address specifies a descriptor for a group of destinations (e.g., multiple nodes). If the second MSB indicates that the destination address specifies a group descriptor, the bits of the destination address can include an identifier for the group of destinations. In one implementation, the group descriptor can be used by a node's communication hardware to assign links for transmitting the message, as described below.

Routing of a message using the example addressing scheme 400 does not require a complex routing scheme, e.g., complex routing tables. For a single destination message sent from a source computational node 104 of a unit of the lowest layer, the link on which to send the message packet is either to one of the other seven peer computational nodes 104 of the same unit or to the switch node 108 to which the source computational node 104 is connected (e.g., by a switch to node link 110 of FIG. 1). The message is sent on a link (e.g., a node to node link 106 of FIG. 1) to one of the other seven peer computational nodes 104 if the groups 410 of bit fields Add1 to Add9 are equal as between the address of the source computational node 104 and the address of the destination computational node 104 specified in the header of the message packet. The message is sent on a link to the connected switch node 108 of the second layer if the groups 410 of bit fields Add1 to Add9 are not equal as between the address of the source computational node 104 and the address of the destination computational node 104.

For message routing at a switch node 108, a similar comparison of the address bit fields is performed. For example, for a given switch node 108 of a unit of a given layer L, the link on which to send a single destination message packet is either to the switch node 108 of layer L+1 to which the given switch node 108 is connected (e.g., by a switch to switch link 116 of FIG. 1), to one of the other seven peer switch nodes 108 of the same unit (e.g., by a switch to switch link 116 of FIG. 1), or to one of the eight nodes of layer L−1 to which the given switch node 108 is connected. The link on which the message packet is sent is determined by comparing the bit range Add(L) to Add9 of the address of the given switch node 108 to the corresponding bit ranges of the address of the destination node. Routing of a message is further described below with respect to FIGS. 10-11.

The example addressing scheme 400 for the hierarchical tree network 200 provides a low hop count to node ratio for point to point or multicast. In this example network 200, a message transmitted from any first computational node 104 of a unit can reach any second computational node 104 of a different unit in a maximum of 18 hops. For example, from the first computational node 104 of a first unit at layer L=0, a message takes nine hops to reach the highest layer (i.e., layer L=9) of the hierarchical structure and takes another nine hops to reach the lowest layer (i.e., layer L=0) to be routed to a second computational node 104 of a second unit of the lowest layer. However, if the message does not need to be routed to the highest layer because one or more of the groups 410 of more significant bits are common between the source computational node 104 and the destination computational node 104, the message can be routed in fewer than the maximum 18 hops.

In some implementations, the four-byte address word is the first portion of the message packet header received. The four-byte address word can be followed by the packet size field, which indicates how much data to transmit. This configuration facilitates a streamed link protocol, allowing any switch node 108 to begin forwarding a message once the four-byte address word is received and before the message packet has been completely received at the switch node 108, minimizing latency unless the message packet needs to be buffered due to congestion. For a latency of two cycles per hop, the maximum latency from the start of sending a message from a source computational node 104 to the start of receiving the message at a destination computational node 104 is 36 cycles, if the protocol is streamed and the message packet does not need to be buffered.

Figure 5:
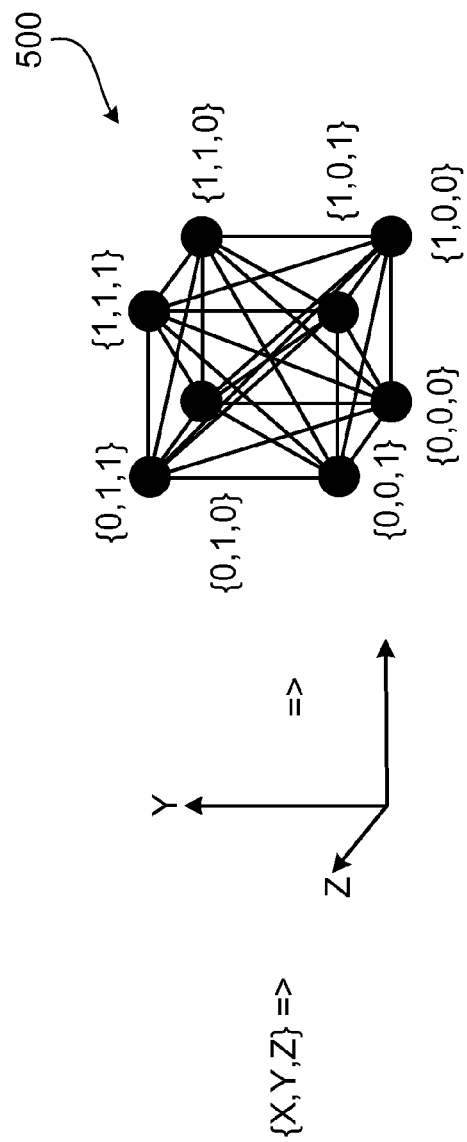
FIG. 5 illustrates example addressing for a 2×2×2 unit of a hierarchical 3-D network.

FIG. 5 illustrates example addressing 500 for a 2×2×2 unit of a hierarchical 3-D network, for example the example hierarchical 3-D network 300 of FIG. 3. The unit has eight fully connected nodes in a 2×2×2 arrangement as a cubic network with two nodes per side in each of three dimensions: X, Y, and Z. Each node can be logically located within the cubic network using a 3-D address {X, Y, Z} from {0,0,0} to {1,1,1}. That is, each node is addressed within the unit using three bits, each bit for each of the three dimensions.

The hierarchical tree network 200 of FIG. 2 illustrates the ease of reaching any node from any other node by simply traversing the tree network vertically between layers and horizontally within units. The hierarchical 3-D network 300 of FIG. 3 illustrates the complexity and the flexibility attainable by the network. A system implementing a hierarchical 3-D network topology can be represented by both the hierarchical tree network 200 and the hierarchical 3-D network 300 and can use the addressing scheme 400 of FIG. 4, where addressing of each 2×2×2 unit is through the addressing 500 of FIG. 5. From the hierarchical tree network 200 view, a 3-bit address field can identify one of eight nodes of a unit. From the hierarchical 3-D network 300 view, a 3-bit address field can be used as an index on the 3-D Cartesian coordinates of a local cubic network.

Figure 6:
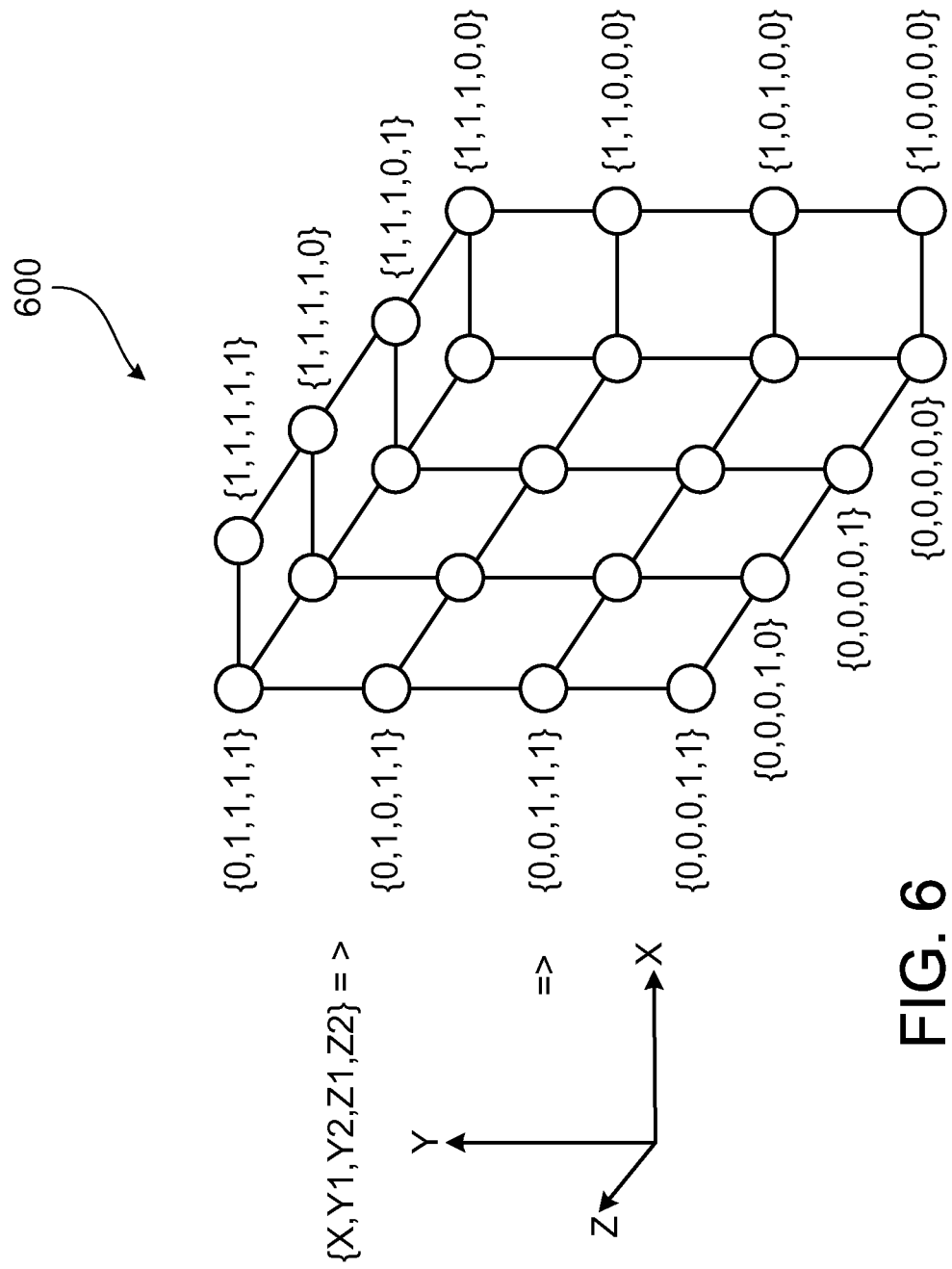
FIG. 6 illustrates example addressing for a 2×4×4 unit of a hierarchical 3-D network.

FIG. 6 illustrates example addressing scheme 600 for a 2×4×4 unit of a hierarchical 3-D network. The unit has 32 fully connected nodes (not all shown) in a 2×4×4 arrangement as a 3-D network with two nodes per side in the X dimension and four nodes per side in each of the Y and Z dimensions. Each node can be logically located within the local network using a 3-D address {X, Y1, Y2, Z1, Z2} from {0,0,0,0,0} to {1,1,1,1,1}. That is, each node is addressed within the unit using five bits: one bit for the X dimension, two bits for the Y dimension, and two bits for the Z dimension. Although FIGS. 5 and 6 illustrate two addressing examples (i.e., 2×2×2 and 2×4×4 arrangements) for units of hierarchical 3-D networks, different addressing for other 3-D node arrangements can be implemented in hierarchical 3-D network topologies.

In some implementations, one or more point to point links between nodes can be deactivated. For example, on a system implementing a hierarchical 3-D network with the example addressing 600 for 2×4×4 units of the hierarchical network, if an application running on the system requires only 18 nodes per unit, the 2×4×4 units can be connected as 2×3×3 units, with certain logical links between nodes in the Y and Z dimensions deactivated.

In some implementations, units of all layers of the hierarchical network have the same, local 3-D network topology. In these implementations, each of the groups of address bits identifying a node in a unit of a layer has the same number of bits.

In some implementations, units of different layers of the hierarchical network can have different, local 3-D network topology. In these implementations, the groups of address bits identifying nodes in units of different layers can have different numbers of bits. For example, the units of computational nodes of the lowest layer can have a local 2×4×4 network topology, where each computational node of a unit is identified by a 5-bit address field (e.g., {X,Y1,Y2,Z1,Z2}), while the units of switch nodes of the higher layers can have a local 2×2×2 network topology, where each switch node of a unit is identified by a 3-bit address field (e.g., {X, Y, Z}).

Figure 7:
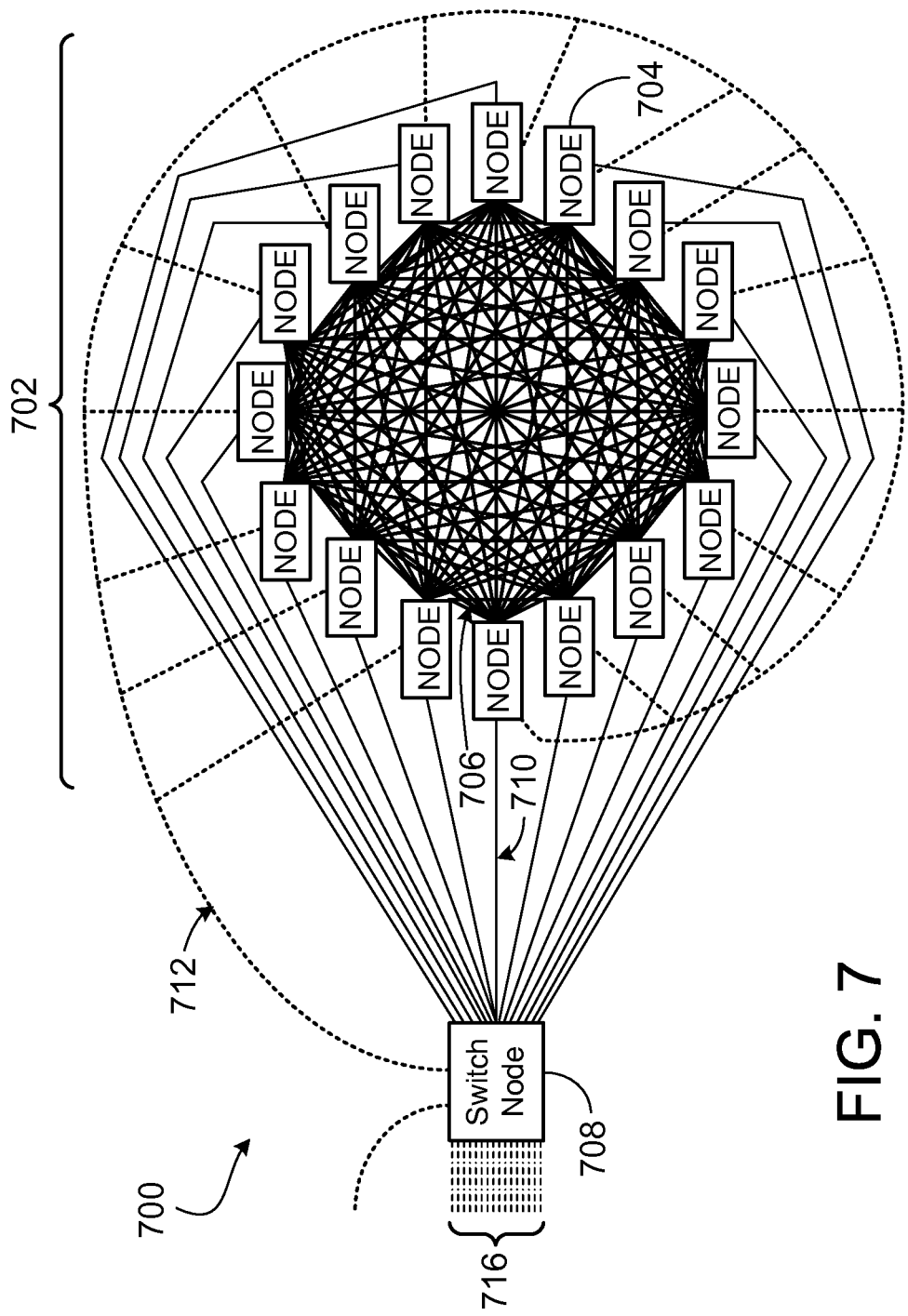
FIG. 7 illustrates an example network having a network topology.

Hierarchical network topologies can be implemented as networks of dimensions higher than three. For example, a system can implement a hierarchical four-dimensional (4-D) network topology. FIG. 7 illustrates an example network topology 700, which can have four dimensions.

FIG. 7 illustrates a unit 702 of computational nodes 704 at the lowest layer in a hierarchical structure of a network topology 700. The local network topology of the unit 702 is formed around sixteen computational nodes 704. In one example, the local network topology of the unit 702 can be a 2×2×2×2 network topology.

Each computational node 704 is connected to each other computational node 704 of the unit 702 by a point to point link 706. Each computational node 704 is connected to a switch node 708 of a unit in the next higher layer by a point to point link 710. Each computational node 704 is also connected to each other computational node 704 of the unit 702 and the switch node 708 by a local broadcast network 712 for the unit 702. The switch node 708 can bridge the local broadcast network 712 for the unit 702 to other local broadcast networks of other units of the hierarchical structure of the network topology 700. In some implementations, each computational node 704 is also connected to each other computational node 704 of the unit 702 and the switch node 708 by an Ethernet network (not shown).

Figure 8:
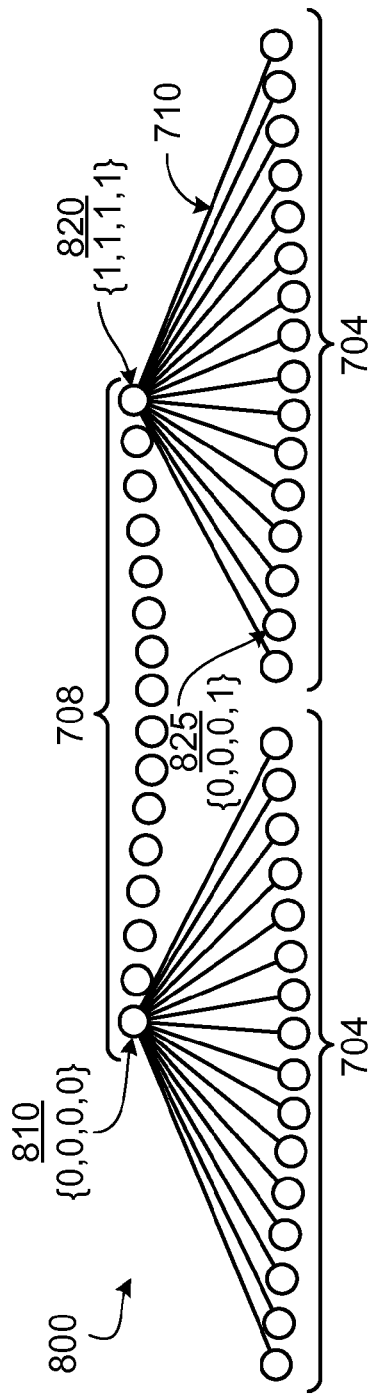
FIG. 8 illustrates an example hierarchical tree network.

FIG. 8 illustrates an example hierarchical tree network 800. The example hierarchical tree network 800 illustrates one way of viewing the hierarchical structure of the example network topology 700 of FIG. 7. In one example, the local network topology of each unit in the example hierarchical tree network 800 can be a 2×2×2×2 network topology.

The example hierarchical tree network 800 includes one layer of switch nodes 708 and one layer of computational nodes 704. The layer of computational nodes 704 is the lower layer, while the layer of switch nodes 708 is the higher layer. There are sixteen nodes in each unit of a layer in the example hierarchical tree network 800. Each switch node 708 acts as a switch for the nodes of a unit in the lower layer. For this example, the lower layer includes $16^2=256$ computational nodes 704.

For clarity of FIG. 8, only two sub-trees from the higher layer of switch nodes 708 are illustrated. Hence, only a portion of the switch to node links 710 are illustrated. Additionally, the node to node links between the computational nodes 704 of a unit of the lower layer and the switch to switch links between the switch nodes 708 of the unit of the higher layer are not illustrated.

Figure 9:
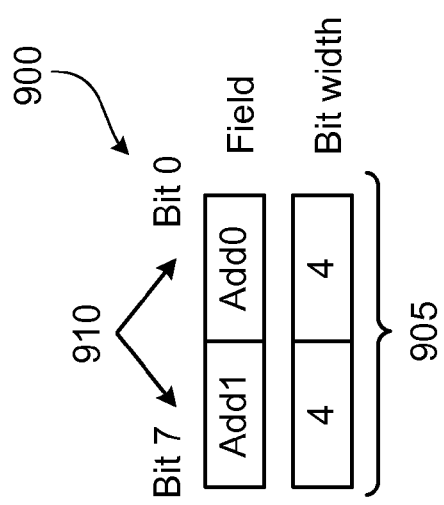
FIG. 9 illustrates an example addressing scheme for the hierarchical tree network of FIG. 8.

FIG. 9 illustrates an example addressing scheme 900 for the hierarchical tree network 800 of FIG. 8. The example addressing scheme 900 provides a destination address for a message as an 8-bit address 905 (i.e., from bit 0 to bit 7) in one byte. The 8-bit address 905 is divided into two groups 910 of four bits, i.e., bit fields Add0 and Add1. If each unit of the hierarchical tree network 800 has a local, 2×2×2×2 network topology, each node is addressed within a unit using one bit for each of four dimensions. In some implementations, an addressing scheme for the hierarchical tree network 800 of FIG. 8 can use more than one byte, with spare bits (not shown) reserved for future use.

The group 910 of four LSB of the 8-bit address 905 (i.e., bit field Add0) identifies a particular computational node 704 of a unit of the lower layer of the hierarchical tree network 800, while the group 910 of four MSB (i.e., bit field Add1) corresponds to a particular switch node 708 of the higher layer in the hierarchical structure. Each computational node 704 is fully addressed by the complete 8-bit address 905 (i.e., by bit fields Add0 and Add1). Each switch node 708 of the higher layer is fully addressed by a partial address using the bit field group 910 of MSB (i.e., bit field Add1). For example, the switch nodes 810 and 820 of FIG. 8 are fully addressed by Add1={0,0,0,0} and Add1=(1,1,1,1}, respectively. The computational node 825 of FIG. 8 is connected by a point to point link to the switch node 820 and is fully addressed by {Add1, Add0}={1,1,1,1,0,0,0,1}.

Figure 10:
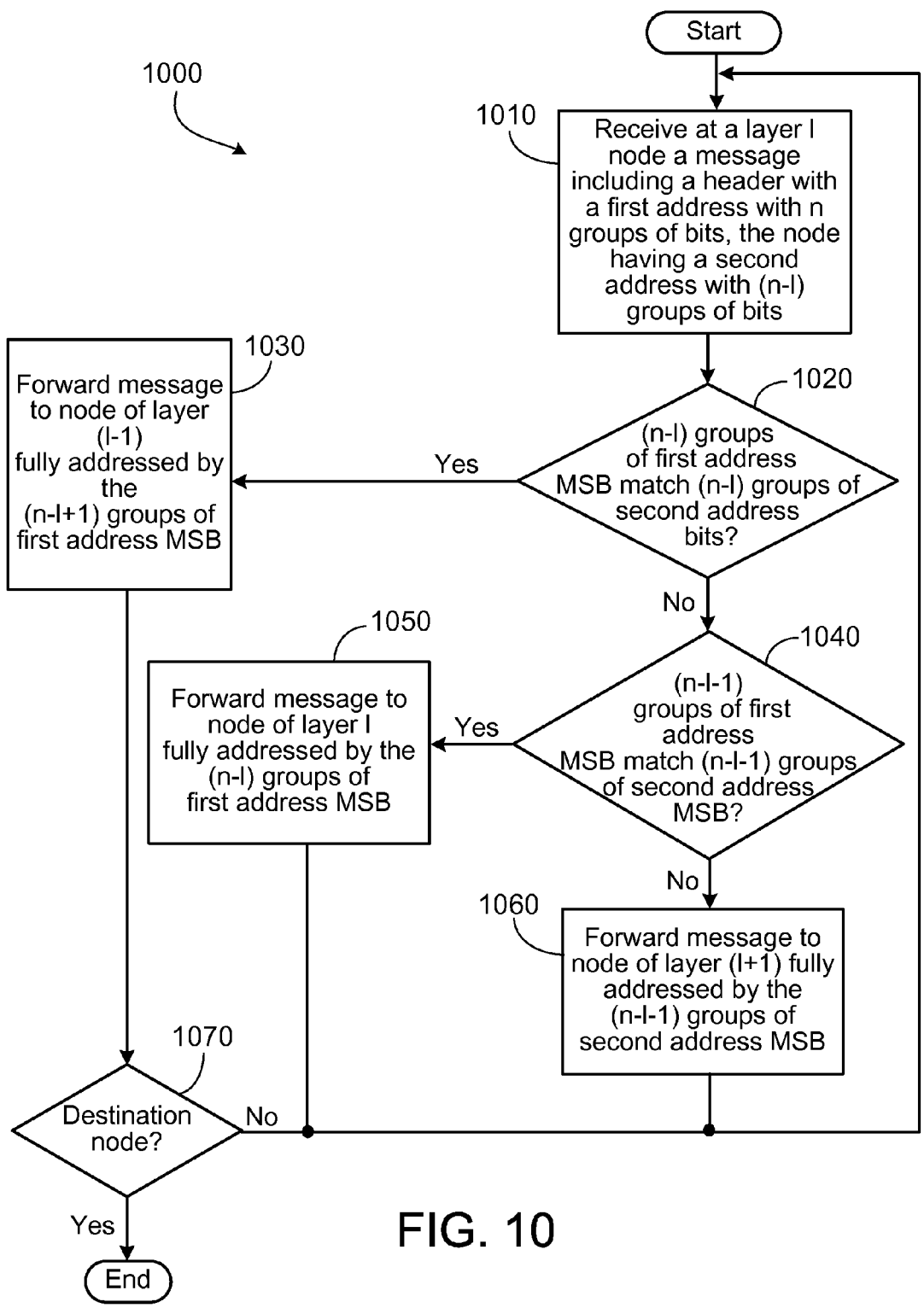
FIG. 10 is a flow chart of an example process for routing a message received at a switch node in the hierarchical tree network of FIG. 2 using the addressing scheme of FIG. 4.

FIG. 10 is a flow chart of an example process 1000 for routing a message received at a switch node in the hierarchical tree network 200 of FIG. 2 using the addressing scheme 400 of FIG. 4. For convenience, the example process 1000 is described with reference to FIGS. 1-2 and 4 and a system that performs the process 1000.

The example process 1000 is for an addressing system of a network topology (e.g., the network topology 100 of FIG. 1). The network topology has a hierarchical structure of nodes including n layers. The n layers include n−1 layers of switch nodes and 1 layer of computational nodes. The layer in the structure is represented by "L", which is an integer where L=0 represents the lowest layer and L=n−1 represents the highest layer. For a message received at a switch node of a given unit in layer L of the structure, the example process 1000 routes the message either up a layer in the structure (i.e., to the switch node in the layer L+1 directly connected to the switch nodes of the given unit), down a layer in the structure (i.e., to one of the nodes in the layer L−1 directly connected to the switch node), or to one of the other peer switch nodes of the given unit.

The system receives a message at a switch node of layer L of the structure, where the message includes a header with a first address (e.g., a destination address) including n groups of bits, and the switch node has a second address including n−L groups of bits (step 1010). For example, the addressing system can be the example addressing scheme 400 of FIG. 4, where the 30-bit address 405 for each computational node includes ten groups 410 of bits.

The system determines if the n−L groups of MSB of the first address match the n−L groups of bits of the second address (decision 1020). For example, the system can determine if the groups of bits match by applying bit masks to the respective groups of bits of the first and second addresses.

If the system determines that the n−L groups match ("yes" branch of decision 1020), the system forwards the message on a point to point link to a node of layer L−1 of the structure that is fully addressed by the n−L+1 groups of MSB of the first address (step 1030). For example, the system can forward the message down one level of the hierarchical tree network 200 to a switch node on a switch to switch link (e.g., a switch to switch link 116 of FIGS. 1-2) or to a computational node on a switch to node link (e.g., a switch to node link 110 of FIGS. 1-2).

The system determines if the node receiving the message (i.e., the node of layer L−1 that is fully addressed by the n−L+1 groups of MSB of the first address) is the destination node (decision 1070). For example, the system can determine if the node receiving the message is a computational node fully addressed by all the bits of the first address. If the system determines that the node receiving the message is the destination node ("yes" branch of decision 1070), the example process 1000 ends. If the system determines that the node receiving the message is not the destination node ("no" branch of decision 1070), the example process 1000 repeats from step 1010, where the message is received at the node of layer L−1.

If the system determines that the n−L groups do not match ("no" branch of decision 1020), the system determines if the n−L−1 groups of MSB of the first address match the n−L−1 groups of MSB of the second address (decision 1040). If the system determines that the n−L−1 groups match ("yes" branch of decision 1040), the system forwards the message on a point to point link to a switch node of layer L of the structure that is fully addressed by the n−L groups of MSB of the first address (step 1050). For example, the system can forward the message horizontally within the unit of the layer L of the hierarchical tree network 200 on a switch to switch link (e.g., a switch to switch link 116 of FIGS. 1-2) to one of the peer switch nodes of the same unit. The example process 1000 repeats from step 1010, where the message is received at the node of layer L.

If the system determines that the n−L−1 groups do not match ("no" branch of decision 1040), the system forwards the message on a point to point link to a switch node of layer L+1 of the structure that is fully addressed by the n−L−1 groups of MSB of the second address (step 1060). For example, the system can forward the message up one level of the hierarchical tree network 200 on a switch to switch link (e.g., a switch to switch link 116 of FIGS. 1-2) to the only switch node of layer L+1 that is directly connected to the switch nodes of the unit. The example process 1000 repeats from step 1010, where the message is received at the node of layer L+1.

Figure 11:
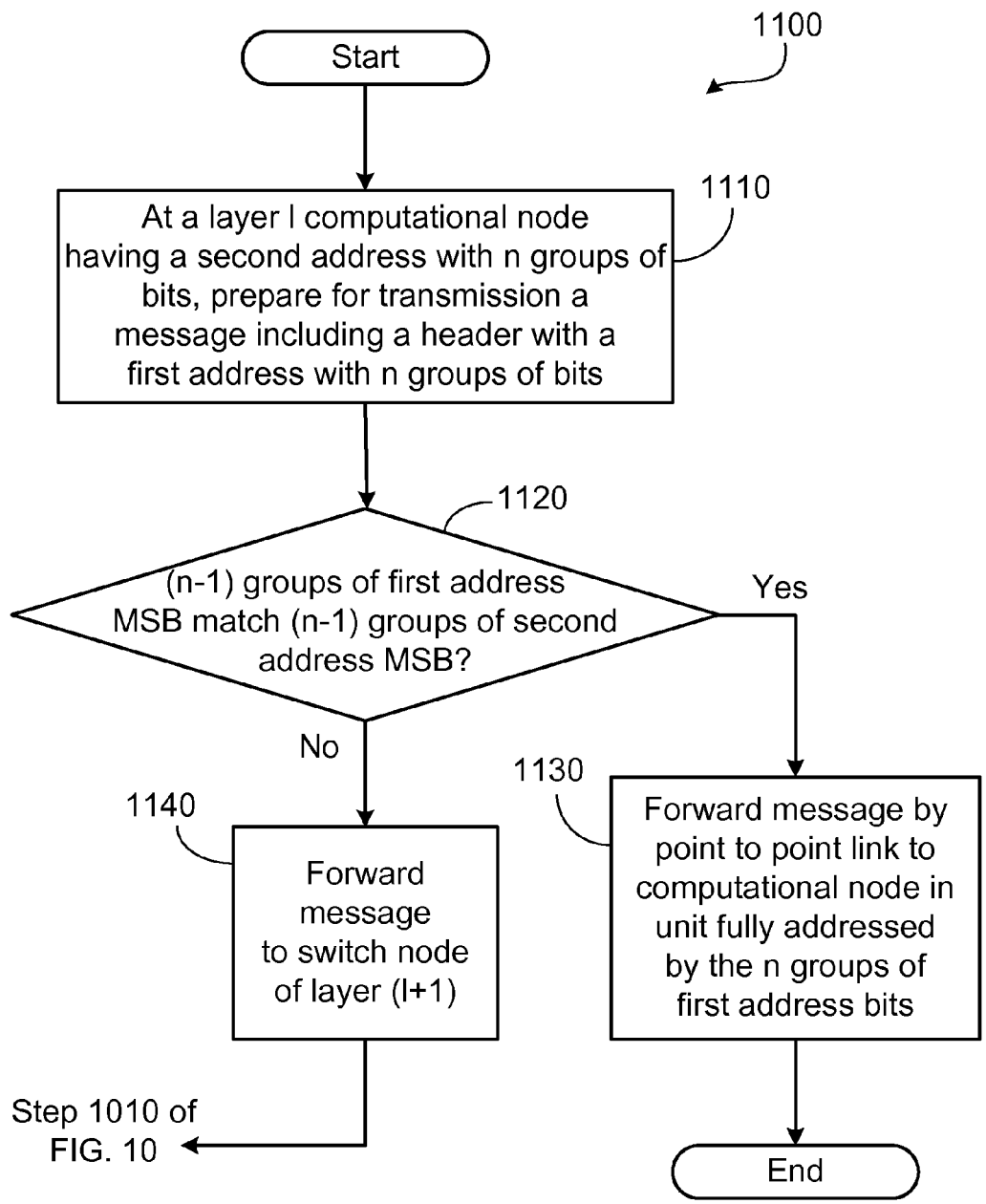
FIG. 11 is a flow chart of an example process for routing a message originating from a computational node in the hierarchical tree network of FIG. 2 using the addressing scheme of FIG. 4.

FIG. 11 is a flow chart of an example process 1100 for routing a message originating from a computational node in the hierarchical tree network 200 of FIG. 2 using the addressing scheme 400 of FIG. 4 to a destination node. For convenience, the example process 1100 is described with reference to FIGS. 1-2 and 4 and a system that performs the process 1100.

The example process 1100 is for an addressing system of a network topology (e.g., the network topology 100 of FIG. 1). The network topology has a hierarchical structure of nodes including n layers. The n layers include n−1 layers of switch nodes and 1 layer of computational nodes. The layer in the structure is represented by "L", which is an integer where L=0 represents the lowest layer and L=n−1 represents the highest layer. For a message originating from a computational node of a given unit in layer L of the structure, the example process 1100 routes the message either up a layer in the structure (i.e., to the switch node in the layer L+1 directly connected to the computational nodes of the given unit) or to one of the other peer computational nodes of the given unit.

The message is being routed from a computational node of layer L of the structure. The message includes a header with a first address (e.g., a destination address) including n groups of bits, and the computational node has a second address (e.g., a source address) including n groups of bits. For example, the addressing system can be the example addressing scheme 400 of FIG. 4, where the 30-bit address 405 for each computational node includes ten groups 410 of bits.

The system determines if the n−1 groups of MSB of the first address match the n−1 groups of MSB of the second address (decision 1120). This check determines if the destination node is in the given unit. If the system determines that the n−1 groups match ("yes" branch of decision 1120), indicating that the destination node is in the given unit, the system forwards the message on a point to point link to a computational node of layer L of the structure that is fully addressed by the n groups of bits of the first address (step 1130). For example, the system can forward the message horizontally within the unit of the layer L of the hierarchical tree network 200 on a node to node link (e.g., a node to node link 106 of FIG. 1) to one of the peer computational nodes of the same unit. The computational node of layer L that receives the forwarded message is the destination node specified by the first address. Following step 1130, the example process 1100 ends.

If the system determines that the n−1 groups do not match ("no" branch of decision 1120), indicating that the destination node is in a different unit, the system forwards the message on a point to point link to a switch node of layer L+1 of the structure that is fully addressed by the n−1 groups of MSB of the second address (step 1140). For example, the system can forward the message up one level of the hierarchical tree network 200 on a switch to node link (e.g., a switch to node link 110 of FIGS. 1-2) to the only switch node of layer L+1 that is directly connected to the computational nodes of the unit. The example process 1100 continues to step 1010 of FIG. 10, where the message is received at the switch node of layer L+1.

In some implementations, the system is initialized (e.g., booted) using an Ethernet connection from a server. The initialization process can convey node address and level information if the system's network topology is specified in a configuration file. In some implementations, the system can detect the network topology autonomously. The system can verify that the actual system matches the specified network topology.

In some implementations, a system can be designed with a hierarchical 3-D network topology (e.g., a network topology represented by both the hierarchical tree network 200 and the hierarchical 3-D network 300) using one or more connected semiconductor devices. For example, the system can be implemented on multiple programmable logic devices, such as a field programmable gate array (FPGA) for each node. In some implementations, each node is implemented with an application specific integrated circuit (ASIC). In other implementations, each unit of multiple nodes (e.g., eight nodes) is implemented with an ASIC, concentrating all the point to point communication links of a unit within the ASIC for the unit, providing fast local communication within the unit.

In some implementations, one or more nodes of the system include a controller, a processor, and memory. In some implementations, the controllers, the processors, and the memory of multiple nodes (e.g., one switch node, acting as a hub, surrounded by eight computational nodes) are integrated on one or more dies of a silicon wafer.

In some implementations, each computational node of the system includes a processor, e.g., a central processing unit (CPU), and communication hardware, e.g., implemented as a controller. Traffic received on links from other nodes can be passed to a given computational node's processor by the given computational node's communication hardware. Traffic can be monitored to gather statistics on link conditions using software-readable registers of the communication hardware. Traffic from the given computational node can be sent by the given computational node's communication hardware. For example, if the destination of the traffic is a single point, the given computational node's communication hardware can route the traffic to another computational node of the same unit or the switch node connected to the given computational node, as appropriate. If the destination of the traffic is multiple points (e.g., multicast to a group of nodes), the processor software can use a group descriptor to assign links for sending the data, where the links can be links to other nodes or a link on the broadcast network. The given computational node's communication hardware then sends the data on the assigned links. In some implementations, a computational node's communication hardware is implemented as an FPGA.

In some implementations, one or more switch nodes of the system include a processor and communication hardware. Traffic received at a given switch node can be forwarded by the given switch node's communication hardware on the appropriate link. Group traffic received at a given switch node can be intercepted by the given switch node's processor and forwarded by the given switch node's communication hardware on links assigned according to a group descriptor.

In some implementations, at a switch node or a computational node, the node's communication hardware can begin sending a packet once the destination address is received at the node and before the whole packet has arrived. Including the destination address and size of the packet as the first two elements of the message header facilitates this process. Since all the communication links can run at the same data rate, there is no difference between the data arrival rate and the data transmission rate. The check of the packet can be done upon arrival at the destination.

A first in, first out (FIFO) data structure can be provided to allow buffering of a message during times of congestion when the system is close to being overloaded. The amount of use of the FIFOs can indicate to the distributed OS software that distribution of the application needs to be changed. For instance, if one FIFO is in use for every packet, then an overuse of a particular link is indicated and the OS can take action to alleviate the bottleneck. For example, the distribution of the application can be changed dynamically by the OS software.

In some implementations, message packet transfer is performed by a computational node's processor. This allows data being sent from one node to another node to be sent directly from the buffer where the data has been produced, and placed into a buffer where the data is to be utilized, without the switch node processors having to copy the data, thereby improving processing time. That is, the OS software does not copy the data, which improves efficiency since a software copy requires two memory bus accesses—one for read and one for write, and typically, data has to be taken from memory to cache and copied to another cache, which then needs to be flushed. By contrast, the system described herein can use OS hardware at the node to drop the data into memory. The memory buffer to receive the data can be pre-selected and ready for receiving the data. If for any reason, the buffer is not ready, then the OS software can still receive that data, although a copy might be required. In some instances, the application can determine if there is data ready for the application, and then ask for a pointer to that data rather than requesting the OS to copy the data to the application's buffer.

In some implementations, when a packet is scheduled for sending from a computational node, the application makes a call to the OS to pass control of the packet to the OS for sending. In an example implementation, the computational node includes an application processor and an OS processor. The OS is distributed across the whole network and is divided between hardware and software. A message being sent is passed from the application to OS stub software running on the application processor. The packet is then passed to OS hardware on the node, which is administered by the OS software running on the OS processor. Although this example uses two processors, this is not required. In some implementations, the OS hardware at the node is designed to interface to a number of processors with FPGAs, and in the above example, the functionality is divided between the FPGAs and their on-board processors.

By integrating hardware for packet transfer into a computational node's memory management hardware, the OS hardware and software can access the data memory once the application indicates that the packet is ready for sending. The data memory access is processor-transparent, allowing the processor to perform other tasks while the OS software sends the packet. In another example implementation, a cache controller is integrated into the packet hardware, such that the data is sent from or received to the cache memory rather than the main memory. The cache controller is used to move the data to and from main memory.

A packet transmitted from a source computational node to a destination computational node can pass through one or more intermediate switch nodes. A copy operation is not necessary at intermediate switch nodes, because the intermediate switch node's communication hardware determines on which link to transmit the incoming message based on the destination address field received as the first portion of the message packet. This allows the intermediate switch node to begin forwarding the packet on the determined link without needing to copy the message, as long as the determined link is available. In some implementations, a FIFO data structure is used if the determined link is in use to prevent the packet from being lost. By contrast, in conventional networks, complex routing (e.g., using routing tables) is typically required, because multiple messages may need to be transmitted on a single link. The complex routing often requires the message to be temporarily copied before the destination address is decoded from the packet header and the message is forwarded.

When a packet is scheduled to be received at a computational node, the application can expect the arriving packet and allocate a data buffer in the memory of the computational node for the packet. The packet transfer hardware (e.g., communication hardware or a controller implemented with, for example, an FPGA, an ASIC, or a silicon die) of the computational node can place the packet in the allocated data buffer. If the application is not expecting the arriving packet, the OS software can assign a data buffer in the memory of the computational node for the packet. When the application software makes a call to access the packet data, the memory management hardware of the computational node can place the packet in the assigned data buffer for access by the application.

Thus, the packet data does not need to be copied from one memory area to another, rather the data can be put into the memory without a software copy, thereby reducing latency and improving performance. A memory copy operation costs two memory accesses per word, i.e., one read access and one write access. The zero copy scheme described herein eliminates these memory accesses, reducing processing time for packet transfer. Additionally, in a conventional system, the computational node's processor would be unavailable for the duration of a memory copy. By contrast, in the system described above the computation node remains available. Both of these factors (i.e., memory accesses and unavailability of the processor) in a system with intensive packet sending are major causes of bandwidth loss in the system.

Figure 12:
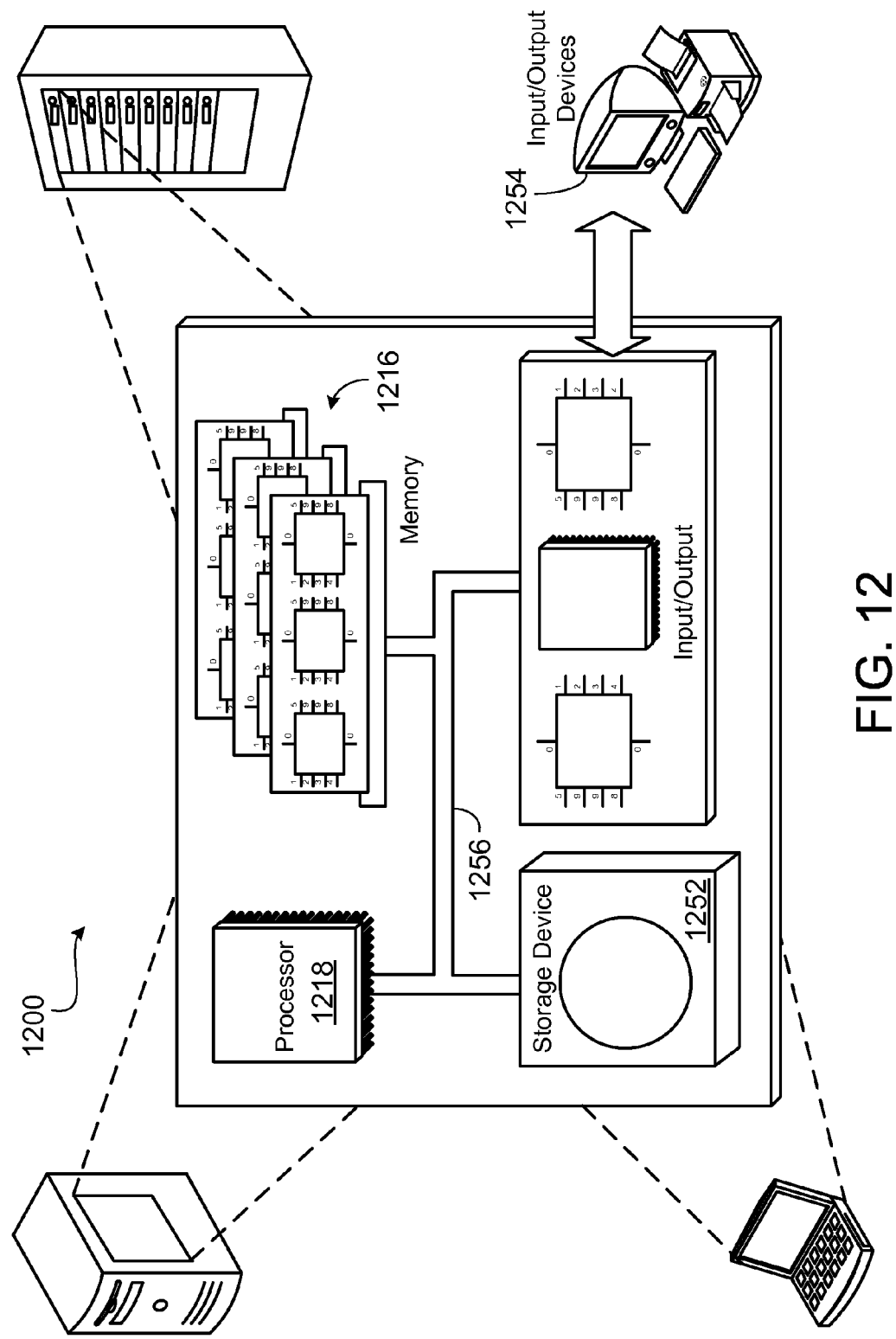
FIG. 12 is a schematic diagram of an example computer system.

FIG. 12 is a schematic diagram of an example computer system 1200. The system 1200 can be used for performing the actions and methods described above. Portions or aspects of a system utilizing a network topology described above can be implemented with one or more elements of the example computer system 1200. The system 1200 can include a processor 1218, a memory 1216, a storage device 1252, and input/output devices 1254. Each of the components 1218, 1216, 1252, and 1254 are interconnected using a system bus 1256. The processor 1218 is capable of processing instructions within the system 1200. These instructions can implement one or more aspects of the systems, components, and techniques described above. In some implementations, the processor 1218 is a single-threaded processor. In other implementations, the processor 1218 is a multi-threaded processor. The processor 1218 can include multiple processing cores and is capable of processing instructions stored in the memory 1216 or on the storage device 1252 to display graphical information for a user interface on the input/output device 1254.

The memory 1216 is a computer readable medium such as volatile or non-volatile that stores information within the system 1200. The memory 1216 can store processes related to the functionality of network routing, for example. The storage device 1252 is capable of providing persistent storage for the system 1200. The storage device 1252 can include a floppy disk device, a hard disk device, an optical disk device, or a tape device, or other suitable persistent storage mediums. The storage device 1252 can store the various databases described above. The input/output device 1254 provides input/output operations for the system 1200. The input/output device 1254 can include a keyboard, a pointing device, and a display unit for displaying graphical user interfaces.

The computer system shown in FIG. 12 is but one example. In general, embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively or in addition, the program instructions can be encoded in an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the spirit and scope of the invention. Accordingly, other embodiments are within the scope of the following claims.

What is claimed is:

1. A network comprising:
    a hierarchical structure of nodes comprising n layers including n−1 layers of switch nodes and 1 layer of computational nodes, where n is an integer greater than 1, where each layer in the structure includes one or more units of nodes and where L represents a layer in the structure and is an integer with L=0 representing a lowest layer and L=n−1 representing a highest layer and a number of nodes in a unit is greater than 1;
    wherein each node in a layer other than the computational layer comprises a switch node for a unit in a next lower layer in the structure and wherein each switch node is configured to receive a packet from a first node and transfer the packet to a second node without copying at the switch node data included in the packet; and
    wherein for each unit:
        each node in the unit is connected to each other node in the unit by a point to point link;
        each node in the unit is connected to a local switch node for the unit by a point to point link; and
        each node in the unit is connected to each other node in the unit and to the local switch node by a local broadcast network for the unit.

2. The network of claim 1, wherein one or more point to point links included in one or more units are deactivated.

3. The network of claim 1, wherein each unit of a layer in the structure has the same number of nodes.

4. The network of claim 1, wherein each unit of each layer in the structure has the same number of nodes.

5. The network of claim 4, wherein each unit comprises a local, three-dimensional network topology represented by a 2×2×2 cube including 8 nodes.

6. The network of claim 4, wherein each computational node comprises a processing element operable to perform instructions of one or more applications.

7. The network of claim 1, wherein the lowest layer in the structure is the layer of computational nodes.

8. The network of claim 1, wherein each node in the unit is connected to each other node in the unit and to the local switch node by an Ethernet network.

9. The network of claim 1, wherein each computational node comprises a processing element, a controller, and memory.

10. The network of claim 1, wherein each computational node comprises communication hardware implemented as a field programmable gate array.

* * * * *